United States Patent Office 3,834,931
Patented Sept. 10, 1974

3,834,931
DECORATIVE LAYER AND A METHOD OF PRODUCING THE SAME
Takatsugu Iwai, Tokyo, and Hiroshi Takeda, Kyoto, Japan, assignors to Kajima Kensetsu Kabushiki Kaisha, Tokyo, and Daichi Kogyo Seiyaku Kabushiki Kaisha, Kyoto, Japan
Filed June 20, 1972, Ser. No. 264,615
Claims priority, application Japan, June 25, 1971, 46/46,685
Int. Cl. B32b 13/04; B44d 1/16
U.S. Cl. 117—45                                                22 Claims

ABSTRACT OF THE DISCLOSURE

A decorative layer and a method for producing the same, in which a mortar composition comprising in admixture hydraulic cement, aggregate, synthetic resin emulsion and water is directly applied onto the surface of a mineral, wood or metal substratum, and then a surface layer consisting of synthetic resin and organic solvent therefor is formed on the surface of mortar layer thus applied, either one or both of said surface layer and said mortar composition containing inorganic pigment.

BAKGROUND OF THE INVENTION

(1) Field of the Invention

The present invention relates to a decorative layer and a method for use in producing the same, and more particularly to a decorative layer and a method for producing the same, in which a mortar composition is directly applied onto the surface of a substratum and then a surface layer is formed on the surface of mortar layer thus applied.

(2) Description of the Prior Art

In general, where cement mortar is applied on the surface of a substratum using trowel or sprayer, with the surface of the substratum dried, the moisture contained in the mortar is absorbed in curing process into the substratum and, as a result, hydration curing of the cement is disturbed so that adhesion strength of the mortar to the surface of the substratum is deteriorated. In order to overcome such shortcoming, there has been proposed a process in which a solution or suspension of synthetic resin is firstly coated or sprayed onto the surface of the substratum to form a film of non-water permeability, and secondly, a mortar layer is formed by coating the film thus prepared. In such a method, not only the formation of the water impermeable film takes time but also drying of the surface of the substratum, adjustment of wetting degree and control thereof require complicated procedure, and therefore limited range of its application results.

For example, where the wetting degree of the surface of the substratum is high, the above-mentioned method is not applicable. Even if the water impermeable layer of the synthetic resin is formed, the mortar tends to fail to adhere to the surface of the substratum.

Also, a method which comprises coating a mortar composition consisting of cement, aggregate and water onto the substratum is known for those skilled in the art. However, even in this method, the resulting layer has poor bonding strength with accompanied formation of cracks, and in addition, the operation to apply such composition involves difficulties.

Still further, a method which comprises the step of coating only a mortar composition, which is prepared by merely mixing cement, aggregate, synthetic resin emulsion, and water onto the surface of the substratum, is also known for those versed in the art, and the synthetic resin used therein has poor bonding strength, because of the absence of surface layer coupled with poor resistance against rain or atmosphere as well as susceptibility to discoloration or spoiled appearance. In addition to this, the appearance of article thus produced is not satisfactory and thus not suitable for use in a decorative layer.

Furthermore, a method which comprises the step of a decorative layer by coating a composition consisting of aggregate, synthetic resin, organic solvent and, if necessary, cement is known for those skilled in the art, but this composition tends to adversely affected by the existence of moisture. This requires the removal of the moisture from the surface of substratum, which is not preferable from the standpoint of operations. The content of the synthetic resin in solid state based on the amount of mortar composition is conventionally 2% or below based on the total amount of cement, aggregate and so on.

SUMMARY OF THE INVENTION

An object of the present invention is to provide a decorative layer and a method of producing the same which is free from the foregoing defect.

The present invention relates to a decorative layer and a method for producing the same, in which a mortar composition prepared by mixing hydraulic cement, aggregate, synthetic resin emulsion and water is directly applied onto the surface of a mineral, wood or metal substratum to form an under coating and then a surface layer forming composition consisting of synthetic resin and organic solvent therefor is coated on the surface of the mortar composition, while either one or both of the mortar composition and the surface layer contain an inorganic pigment.

According to the present invention, there is no need to provide a waterproofing film on the surface of the substratum as in the conventional practice with the result that the decorative layer formed has a high adhesion strength due to the direct coating of a mortar composition on the surface of the substratum independently of the dryness and the degree of wettability of the surface condition. This procedure insures efficient and reliable high strength aplication of the decorative layer to the substratum.

The substratum as employed in the present invention includes the floor, wall and board made from mineral substance such as concrete, mortar, slate, building stone and the like, wood material such as plywood, hardboard and the like, and metallic material such as iron. The surface of the substratum may be used as they are, i.e. without any further treatment, but sometimes the surfaces are smoothed and cleaned, and discontinuities such as notched portions or holes are caulked. In case the ambient temperature is high, the water is used for wetting. For the caulking, the mortar composition of the present invention may be utilized.

The mortar composition of the present invention consists of hydraulic cement, aggregate, synthetic resin emulsion, water and, if necessary, inorganic pigment.

The hydraulic cement may be selected from any cements including Portland cement, while aggregate may be any types including silica sand. The hydraulic cement and aggregate are mixed together in the ratio of 1:4 to 4:1 by weight.

Included by the synthetic resin which may be used for preparing the synthetic resin emulsion, are epoxy, polyacrylate, polymethacrylate, polyvinyl acetate, polyvinyl chloride, polyesters, polyurethane, melamine, alkyd, which can be emulsified. Among them, the first five are preferably applicable to this end. Particularly epoxy has high bridge bonding strength, good water resistance, flexibility, chemical resistance and low shrinkage and excellent stability with the substratum thus insuring best adaptability as the material to be used. The epoxy may be used alone or in combination with the synthetic resin capable of emulsifying such as polyvinyl acetate, polyacrylate, polymethacrylate, styrene butadiene copolymer resin, ethylene vinyl acetate copolymer resin. These synthetic resins are used in the form of an o./w. type (oil in water) emulsion obtained by using surface activating agents or agent, such as a non-ionic surface activating agent. The synthetic resin emulsion is used therein in an amount comprising between about 5 to 30 percent by weight of the total weight of hydraulic cement and aggregate, the weight of resin being calculated as the weight of the solids therein. Preferably, the amount of resin is between about 10 to 30 percent by weight of the total of the hydraulic cement and aggregate. Within the broad range of resin content, both the adhesion of the mortar composition to the surface of the substratum and the water-retaining property of the mortar is improved. The improvement in the water retaining property of the mortar is of particular significance in that it avoids the need associated with prior art compositions for forming a water impermeable layer on the substratum in order to prevent absorption of water into the substratum from the mortar composition. The enhanced water retention also prevents undue evaporation of moisture from the mortar layer and the layer formation problems associated therewith. If the resin solids content is less than 5% by weight as described above, poor adhesion at the time of spraying and resultant splashing and runoff of the material is encountered. Preferably, the resin solids content is at least 10% by weight, same basis as above. The presence of resin solids in more than 30% by weight as defined, tends to cause sagging of the material which may slip off the wall surface.

The amount of water in the mortar composition may be preferably adjusted to 15–85% by weight in terms of the total value of the synthetic resin emulsion, the hydraulic cement nad aggregate in the mortar composition. The amount of water as is referred to herein is the amount of free water contained in the mixed substance of the mortar composition with the water present in the surface of the substratum in addition to the water to be added. Where the amount of the water is less than 15% by weight, the homogeneity of the mixed substance of the mortar composition may be impaired and thus inhomogeneous material can only be obtained coupled with poor workability. On the other hand, where water is above 85% by weight, there results sagging which in turn leads to poor hiding power.

The inorganic pigment may be added, if necesary, to the mortar composition. Preferable as the inorganic pigments are those having anti-alkali property and weatherproofing property, and the amount of proportion thereof may be acceptable to such an extent where the physical properties of the mortar composition are not impaired, preferably about 10% by weight based on the total amount of the hydraulic cement, aggregate,, synthetic resin emulsion solid value.

The mortar composition may be added with anti-sagging agent, deforming agent and other blending agents.

The mortar composition of the present invention is prepared by mixing homogeneously the various kinds of the foregoing substances at a predetermined ratio. The mixture is applied by means of a spray gun or rolls. When a cement spray gun is used, the spraying pressure may be at 2–10 kg./cm.$^2$. When the composition is applied at lower temperatures, setting time is required to be extended. If the temperature is too low, special care must be taken to prevent from being frozen. The use of high temperature may be preferable because the setting time may be shortened, wheras if it is too high, the substratum is dried and the water absorption becomes excessive. One type of application of the mortar composition of the present invention is that the various kinds of the mixing substances are homogeneously mixed at a predetermined ratio, at the mixture is coated in one or more layers to form a continuous single or multi-layer.

Another type of application is that the foregoing mixture comprising the substances at a predetermined ratio is coated in discontinuous single or multi-layer.

Still another type of application of the mortar compositions, which have different viscosities afforded by varying mixing amount of water within the above-mentioned range, are coated in multi-layer to form continuous layers.

The other preferable type of the mortar composition of the present invention is that two kinds or more kinds of mortar compositions, which have different viscosities with variable mixing amount of water in the above-mentioned range, are coated or applied in multi-layer to form either continuous or discontinuous layers. The amount of water in the mortar composition of the continuous layers preferably falls within the range of 35–85% by weight based on the total amount of the solid value of the synthetic resin emulsion, hydraulic cement and aggregate, while the amount of water in the discontinuous layers is preferably at 15–45% by weight. The selection of the amount of water in the both layers may be made so as to fall within the above-mentioned range depending upon the kinds and amounts of the various kinds of the mixing substances, presence of the anti-sagging agent, other blending agents and other various kinds of conditions.

For making continuous layers, spraying or rolling may be used, while for discontinuous layers, spraying is employed for coating. Particularly, the coating is carried out by using a spray gun, not only in the case of the discontinuous layer, but also in the case of the continuous layers, regardless of the one layer of multiple layers to be formed. This provides an irregular surface and imparts to the decorative layer an attractive, orange peel skin-like appearance.

It is preferable to apply the various coating compositions in the thickness of 0.5–10 mm. per each layer. In case of preparing the multi-layer, it should be limited to several layers, and after one layer has been hardened, then the next layer may be coated thereon.

As hereinabove explained, after the mortar composition has been coated onto the substratum and has set or hardened, usually after about three hours, a solution comprising a synthetic resin in an organic solvent is applied to the hardened mortar layer to form a top surface layer.

Depending upon the conditions of the surface of the substratum a sealer of the synthetic resin system may be coated prior to the coating of the surface layer but after the application of the mortar composition. Included in the synthetic resin which is used in the formation of the surface layer are polyacrylate, polymethacrylate, polyvinyl chloride, alkyd, polyurethane, ester acrylate and the like and these resins are used in the form of solution. To the solution composed of resin and solvent, there may be added, if desired, inorganic pigment. The coating of the solution is effected using brush, roller or spray, several times, with the usage of 50–250 g./m.$^2$ for each cycle of spray.

The mortar layer thus formed is further strengthened with the surface layer formed which gives water repellent property and luster to the top surface.

The inorganic pigment is capable of producing various kinds of colors and a combinations of colors by mixing various kinds of hues in one layer of the mortar composition and either one or both of the multi-layers and the surface layer or more than two layers depending upon the kinds of the decorating layers to be obtained.

BRIEF DESCRIPTION OF THE DRAWING

The drawings are provided for better understanding of the present invention and show various kinds of examples shown in enlarged views.

7 and 8 show cross sectional views illustrating testing methods.

DETAILED DESCRIPTION OF THE INVENTION

Figure 1:
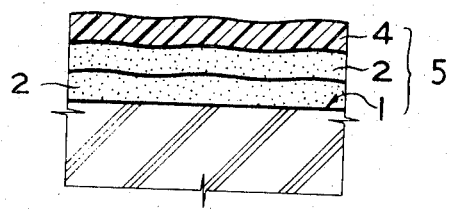
FIGS. 1, 2, 3, 4, 5 and 6 show cross sectional views of the decorating layers and FIGS.

The various kinds of the embodiments of the mortar composition of the present invention will be explained with reference to the accompanied drawings. One type of application of mortar composition of the present invention is shown in FIG. 1 by referring to a case where two continuous layers are formed, in which the uniform mortar composition is formed into a continuous layer and such layer is made in one layer or multi-layers.

Figure 2:
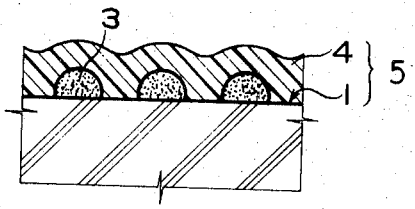

The other type shown in FIG. 2 by referring to a case where one discontinuous layer is formed in lamination, in which uniform mortar composition is formed in multi-layers with one or multiple layers of the discontinuous layers.

Figure 3:
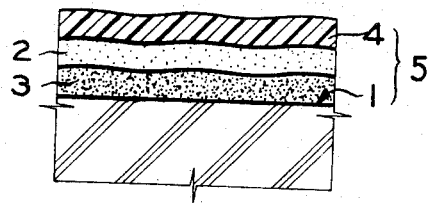
Figure 4:
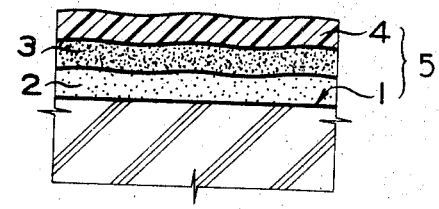

Still other types are shown in FIGS. 3 and 4 in which two kinds or more than two kinds of mortar compositions having different viscosities with varying mixing amount of water are coated in multi-layer form as a continuous layer. FIG. 3 refers to the case where a high viscosity continuous layer is coated in the first place, and then a low viscosity continuous layer is coated, and FIG. 4 refers to the case where it has opposite construction with respect to an intermediate layer.

Figure 5:
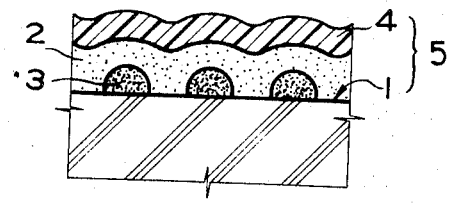
Figure 6:
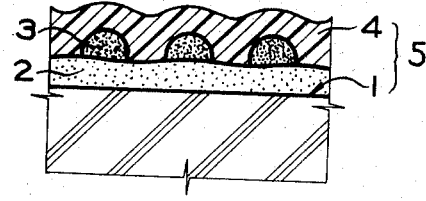

Other preferred types are shown in FIGS. 5 and 6 in which two kinds or more than two kinds of the mortar compositions having different viscosities with varying mixing amounts of water are coated in multi-layers as the continuous layer and the discontinuous layer. Referring to FIG. 5, the mortar composition prepared by mixing synthetic resin emulsion with Portland cement, silica sand, inorganic pigment, other conventional ingredients and the required amount of water is sprayed on the surface 1 of the substratum such as concrete, mortar and the like to form a first layer 3. After this first layer 3 is formed and has been allowed to stand for a while, a mortar composition identical with at used in preparing first layer 3, except that the water content thereof is different to change the workability, i.e., the consistency of the composition, is sprayed on the exposed portions of the surface 1 of the substratum and over the first layer 3 by means of a mortar spray gun to form a second layer 2. After the elapse of sufficient time, a synthetic resin solution is coated as a surface layer 4 on the second layer 2. In this case, in the spraying of the first layer 3 and the second layer 2, two kinds of compositions containing varying amounts of water thereby having low and high viscosities, respectively, are used, and also the kinds of the color tone of the pigment added to the respective compositions is varied to carry out the spraying of interesting designs.

As shown in FIG. 5, the composition of high viscosity is sprayed to produce spot-like accumulation on the surface 1 of the substratum by adjusting the spraying pressure, diameter and the shape of the nozzle of the spray gun, and then as a second layer, the composition of low viscosity is continuously sprayed, to produce wave shaped layer of various design on both the exposed substratum surface and the surface of first layer.

Also, as shown in FIG. 6, as a first layer, the low viscosity composition is continuously sprayed, and then as a second layer, the high viscosity composition is discontinuously sprayed, for example, in spots form, and in this case, different colored pigments are added to the both compositions, it is possible to produce interesting patterns from the standpoint of colors.

It is possible to impart two kinds or three kinds of colors to each layer of the continuous and discontinuous layers.

The representative examples of the present invention will be described in the following.

EXAMPLE 1

(Decorative layer shown in FIG. 5)

The first and second layers were formed by spraying the mortar compositions having composition shown in Table 1 with pressure of 5 kg./cm.$^2$ by means of the mortar spray gun after agitating and mixing them with the mortar mixer. The surface of the substratum was the untreated concrete in which amount of moisture was varied. The nozzle diameter of the mortar spray gun used in the spraying was 8 mm. in the formation of the first layer and was 5 mm. in the formation of the second layer. The formation of the second layer was carried out three hours after formation of the first layer.

TABLE 1

| Mortar composition | Percent by weight | |
|---|---|---|
|  | 1st layer | 2nd layer |
| White Portland cement | 100 | 100 |
| No. 8 silica sand | 83 | 88 |
| Epoxy resin emulsion | 19 | 19 |
| Inorganic pigment | 0 | 8 |
| Asbestos tailing | 5 | 0 |
| Water (moisture in emulsion is included) | 50 | 70 |

Next, after 24 hours from the time of formation of the second layer, ester acrylate resin was brush coated at a deposition rate of 200 g./m.$^2$.

The adhesion strength of the decorative layer 5 formed by the foregoing method with the surface 1 of the substratum was remarkably high as compared with the conventional method as shown in Table 2. Also, the decorative layer 5 which had not been produced by the conventional method was visualized by the present invention.

TABLE 2

| Untreated concrete | | This invention, kg./cm.$^2$ | Conventional method acryl emulsion coating, kg./cm.$^2$ |
|---|---|---|---|
| Moisture conditions | Moisture content | | |
| Immersed in water for 1 week and immediately after taken out from water | 8.6–8.8 | 8.44 | (a) |
| 1 hour after taken out from water | 8.5–8.6 | 9.44 | (a) |
| 8 hours after taken out from water | 8.4 | 9.04 | (a) |
| 9 hours after taken out from water | 8.3–8.4 | 9.48 | (a) |
| 24 hours after taken out from water | 8.0–8.1 | 8.99 | 5–6 |
| Dried in atmosphere | 7.5–7.8 | 9.49 | 5–6 | a Not acceptable.

(Remark 1)

Figure 7:
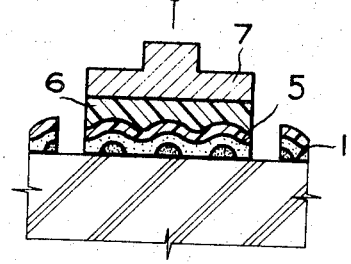

The adhesion strength was obtained by the perpendicular tensile test conducted at the time when 4 weeks passed after the formation of the decorative layer 5. This test method was conducted as shown in FIG. 7 by fixing a steel made attachment 7 on the decorative layer of 100 mm. x 100 mm. by means of an epoxy resin bonding agent 6 and then tensile force was applied to the decorative layer 5 as shown by the arrow in FIG. 7. The number of samples tested according to the moisture conditions of the respective surfaces 1 of the base materials was 8.

(Remark 2)

In the above-mentioned conventional method, a water impermeable film consisting of 25% emulsion of acrylate vinyl acetate copolymer was formed and the mortar composition was coated on the surface of the film. However, the solid component of the synthetic resin emulsion in the mortar composition was set to 2–3% by weight for the total amount of the hydraulic cement and the aggregate.

Figure 8:
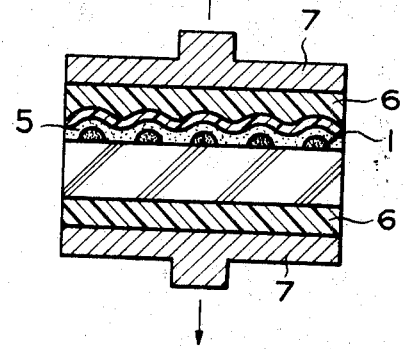

In cases where the substratum is weak, the tensile test to determine the adhesion strength of the mortar layer may be conducted in the manner as shown in FIG. 8.

EXAMPLE 2

(Decorative layer shown in FIG. 6)

The first and second layers were formed by spraying the mortar composition having composition as shown in Table 3 with the mortar spray gun with the pressure of 5 kg./cm.² after agitating and mixing the composition in the mortar mixer. The surface of the base material was a flat plate (thickness was 5 mm.) of asbestos cement which had been dried. The diameter of the nozzle of the mortar spray gun employed in the spraying was 5 mm. for the formation of the first layer and was 7 mm. for the formation of the second layer. The formation of the second layer was conducted at the time when 24 hours elapsed after the formation of the first layer.

TABLE 3

| Mortar composition | Parts by weight | |
|---|---|---|
| | 1st layer | 2nd layer |
| White Portland cement | 100 | 100 |
| No. 8 silica sand | 88 | 88 |
| Epoxy resin emulsion (solid value) | 19 | 19 |
| Inorganic pigment | 8 | 8 |
| Water (moisture in emulsion is included) | 70 | 50 |

Acrylic ester resin solution was coated with a brush at a deposition rate of 200 g./m.² after 24 hours from the time of the formation of the second layer.

With respect to the decorative layer formed by the foregoing method, the adhesion strength of the decorative layer 5 to the surface 1 of the substratum was obtained by the test method similar to the preceding example. This adhesion strength was 155 kg./cm.². In this case, the decorative layer 5 was not broken and the asbestos cement plate which was the substratum was broken. As compared with this adhesion strength, the adhesion strength applied in the conventional method was 0.8 kg./cm.². In this case, the peeling off phenomenon occurred between the mortar and the resin coated on the mortar. As explained above, the adhesion strength was remarkably greater than that obtained by the conventional method and did not produce any peeling off phenomenon between the layers as occurred in the case of the conventional method.

EXAMPLE 3

(Decorative layer shown in FIG. 1)

The mortar composition as shown in Table 4 was treated on the light weight foaming concrete in the manner similar to the example 1. However, the first layer was prepared by using the trowel and a second layer was prepared by a mortar spray gun using a nozzle diameter of 5 mm. Thereafter, the formation of the surface layer was carried out in the manner similar to the Example 1. The adhesion strength between the decorative layer 5 and the surface 1 of the substratum was obtained by the test method similar to the example 1 with respect to the decorative layer formed by the foregoing method, and the destruction of the substratum occurred at 4.8 kg./cm.².

TABLE 4

| Mortar composition | Parts by weight | |
|---|---|---|
| | 1st layer | 2nd layer |
| White Portland cement | 100 | 100 |
| No. 8 silica sand | 33 | 33 |
| Epoxy resin emulsion (solid value) | 19 | 19 |
| Inorganic pigment | 8 | 8 |
| Water (moisture in emulsion is included) | 70 | 70 |

EXAMPLE 4

(Decorative layer shown in FIG. 2)

The formation of the second layer in the example 1 was omitted and the other matters were conducted similarly to the example 1.

The adhesion strength between the decorative layer 5 and the surface 1 of the substratum was obtained by the test method similar to the example 1 and the substratum was broken at 14.7 kg./cm.².

What we claim is:

1. A decorative layer formed on the surface of a substratum, said layer comprising a first undercoating layer formed by a mortar composition containing a mixture of hydraulic cement and aggregate in a weight ratio of from 4:1 to 1:4, synthetic resin emulsion and water whose solid resin component is from 5 to 30% by weight of the total of hydraulic cement and aggregate, the water content being 15 to 85% by weight of the total amount of the hydraulic cement, aggregate and resin component, and a surface layer formed on said undercoating layer by an organic solvent solution of synthetic resin.

2. A decorative layer as defined in laim 1, wherein the mortar composition is deposited in a plurality of separate layers.

3. A decorative layer as defined in Claim 2 wherein the respective mortar compositions of said separate layers are prepared so that different layers have different moisture contents.

4. A decorative layer as defined in Claim 1, wherein said mortar layer is discontinuous.

5. A decorative layer as defined in Claim 1, in which said synthetic resin emulsion in the mortar composition contains an epoxy resin.

6. The decorative layer of Claim 1 wherein said mortar composition contains an inorganic pigment.

7. The decorative layer of Claim 1 wherein said surface layer contains an inorganic pigment.

8. The decorative layer of Claim 1 wherein the resin in said resin emulsion is selected from the class consisting of epoxy, polyacrylate, polymethacrylate, polyvinyl acetate, polyvinyl chloride, polyesters, polyurethane, melamine and alkyd, and the resin in said organic solvent solution is selected from the class consisting of polyacrylate, polymethacrylate, polyvinyl chloride, alkyd and polyurethane.

9. The decorative layer of Claim 1 wherein the resin in said resin emulsion is an epoxy resin and said emulsion further includes one or more resins selected from the class consisting of polyvinyl acetate, polyacrylate, polymethacrylate, styrene butadiene copolymer, and ethylene vinyl acetate copolymer.

10. The decorative layer of Claim 1 wherein the class of resins from which the resin in said emulsion is selected consists of epoxy, polyacrylate, polymethacrylate, polyvinyl acetate and polyvinyl chloride.

11. The decorative layer of Claim 1 wherein said substratum is made of a material selected from the class consisting of mineral, wood and metal.

12. A method of producing a decorative mortar layer having an orange peel skin-like appearance, comprising the steps of: (1) applying directly on the surface of a substratum by means of a spray gun a mortar composition composed of a mixture of (a) hydraulic cement and aggregate in a weight ratio of from 1:4 to 4:1, (b) a synthetic resin emulsion whose solid resin component is from 10 to 30% by weight of the total of hydraulic cement and aggregate, and (c) water in an amount of from 15 to 85% by weight of the total amount of the hydraulic cement, aggregate and solid resin component; and (2) applying over the layer of mortar composition formed thereby a surface layer composed of an organic solvent solution of synthetic resin.

13. A method of producing a decorative layer on the surface of a substratum, comprising the steps of applying directly on the surface of the substratum a mortar composition composed of a uniform mixture of: (a) hydraulic cement and aggregate in a weight ratio of from 1:4 to 4:1, (b) a synthetic resin emulsion whose solid resin component is from 5 to 30% by weight of the total weight of hydraulic cement and aggregate, and (c) water in an amount of from 15 to 85% by weight of the total amount of the hydraulic cement, aggregate and solid resin component and applying to the layer formed by said mortar composition a surface layer consisting of an organic solvent solution of a synthetic resin.

14. A method of producing a decorative layer as defined in Claim 13, in which the mortar composition contains from 35 to 85% by weight of water and is applied in a continuous layer.

15. A method of producing a decorative layer as defined in Claim 13, in which the mortar composition contains from 15 to 45% by weight of water and is applied in a discontinuous layer.

16. A method of producing a decorative layer as defined in Claim 13, in which a first mortar composition containing from 35 to 85% by weight of water is applied to said substratum in at least one continuous layer and a second mortar composition containing from 15 to 45% by weight of water is applied to said substratum in at least one discontinuous layer, and said at least one continuous layer and at least one discontinuous layer are alternately applied to said substratum.

17. The method of Claim 13 wherein an orange peel skin-like appearance is imparted to the decorative layer by applying the mortar composition by spraying it from a spray gun.

18. The method of Claim 13 wherein the mortar composition is applied in a layer from 0.5 to 110 mm. thick.

19. The method of Claim 13 wherein the mortar composition is applied in a plurality of separate layers.

20. The method of Claim 19 wherein at least some of the mortar composition applied in separate layers have respectively different water contents.

21. The method of Claim 19 wherein each layer of mortar composition is applied in a layer of from 0.5 to 10 mm. thickness.

22. A method of producing a decorative layer as defined in Claim 6, in which a first mortar composition containing from 15 to 45% by weight of water is applied to said substratum in at least one continuous layer and a second mortar composition containing from 35 to 85% by weight of water is applied to said substratum in at least one discontinuous layer, and said at least one continuous layer and at least one discontinuous layer are alternately applied to said substratum.

References Cited
UNITED STATES PATENTS

| | | | |
|---|---|---|---|
| 3,089,784 | 5/1963 | Dowling | 117—72 X |
| 3,689,305 | 9/1972 | Hausmann | 117—75 X |
| 3,067,058 | 12/1962 | Gordon | 117—70 R |
| 3,354,169 | 11/1967 | Shafer et al. | 117—194 X |
| 3,379,554 | 4/1968 | Brindamour | 117—100 X |
| 3,480,468 | 11/1969 | Carletti et al. | 117—100 X |
| 3,043,040 | 7/1962 | Silva | 117—45 |

RALPH HUSACK, Primary Examiner

U.S. Cl. X.R.

117—70 R, 72, 75, 104 R